Sept. 29, 1959

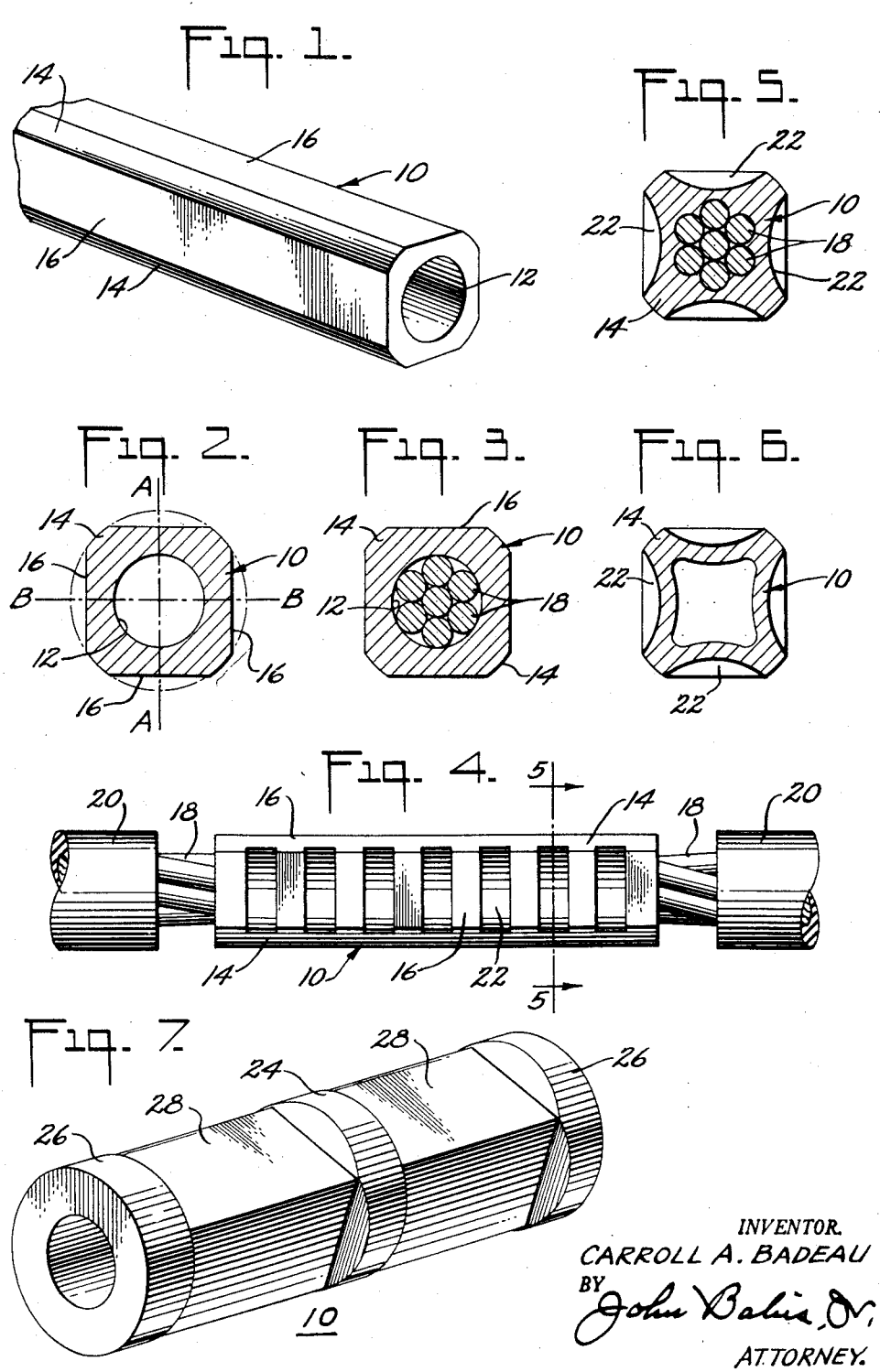

C. A. BADEAU 2,906,017

METHOD OF SPLICING CABLES

Filed Sept. 21, 1955

INVENTOR.
CARROLL A. BADEAU
BY John Babis, Jr.
ATTORNEY.

United States Patent Office 2,906,017
Patented Sept. 29, 1959

2,906,017
METHOD OF SPLICING CABLES

Carroll A. Badeau, Westfield, N.J., assignor to The Thomas & Betts Co., Elizabeth, N.J., a corporation of New Jersey Application September 21, 1955, Serial No. 535,719

1 Claim. (Cl. 29—518)

The present invention relates to cable splicing compression sleeves of the character adapted to be deformed and/or compressed on multiple-strand cable sections for effecting a mechanical and electrical connection therebetween, and more particularly to a pre-shaped compression sleeve, the method of securing the sleeve on such cable sections and apparatus for carrying out the method.

Conventional cable splicing compression sleeves as utilized heretofore were subject to certain disadvantages in that the foot pounds of compressive force required to deform such sleeves on bare, multiple-strand cable sections was such that a heavy compression tool, of the portable field type for example, having a length of approximately twenty-six inches, was necessary. Moreover, the manipulation of such heavy tools required both hands of an operator with an assistant often necessary to hold the work. Thus, it will be apparent that the deformation and/or compression of conventional compression sleeves with a heavy tool as aforesaid was not only difficult, time-consuming and therefore expensive, but also hazardous when carried out in installation locations providing insufficient space for the proper manipulation of such tools.

Accordingly, it is an object of the invention to provide a pre-shaped cable splicing compression sleeve which requires a minimum of foot pounds of compressive force by reason of the fact that it is readily deformable by means of a relatively small compression tool of the short stroke pliers type mounting a matching die set in accordance with the invention.

Another object of the invention is to provide a pre-shaped cable splicing compression sleeve of malleable metal whose annular wall includes spaced areas providing reduced wall thickness lengthwise thereof which require a minimum of foot pounds of compressive force to secure the same on a bare end portion of each of two multiple-strand cable sections in "cold metal flow" relation to effect a mechanical and electrical connection therebetween.

A further object of the invention is to provide a pre-shaped cable splicing compression sleeve of malleable metal whose annular wall presents angularly spaced areas of reduced wall thickness lengthwise thereof whereby compression, deformation and/or indentation thereof is readily accomplished not only with a minimum of time and effort but also in locations affording a minimum of space for a cable splicing operation.

Another object of the invention is to provide a pre-shaped cable splicing compression sleeve of the character specified, which presents a minimum of metal to a compression tool of the short-stroke pliers type, mounting a matching die set, for deformation and/or compression into intimate "cold metal flow" engagement with a bare end portion of each of a pair of multiple-strand cable sections.

With the foregoing objects in view, the invention resides in the pre-shaped cable splicing compression sleeve, the method of deforming and/or indenting spaced, transverse areas thereof substantially throughout its length, and a matching die set including a hand tool of the short-stroke pliers type for carrying out the method.

Accordingly, certain preferred details of construction and procedure together with other objects and advantages will be apparent and the invention clearly understood by reference to the following specification and to the accompanying drawings, wherein:

Fig. 1 is a view in perspective of the pre-shaped cable splicing compression sleeve;

Fig. 2 is an enlarged cross sectional view of the improved connector sleeve as shown in Fig. 1;

Fig. 3 is an enlarged cross-sectional view similar to Fig. 2, showing a multiple-strand cable end portion intruded in one end of the pre-shaped sleeve prior to an indenting operation;

Fig. 4 is a top plan view of the pre-shaped compression sleeve showing a bare end portion of a pair of multiple-strand cable sections intruded in the opposite ends of said sleeve and the sleeve secured thereon in accordance with the invention;

Fig. 5 is an enlarged sectional view taken substantially on the line 5—5 of Fig. 4, and showing the substantially concave or arcuate indentations in each of four angularly spaced plane surfaces provided therefor on the outer surface of the connector sleeve;

Fig. 6 is a view similar to Fig. 5, showing the angularly spaced areas of reduced wall thickness after an indenting operation without a section of cable intruded therein to illustrate how the reduced wall areas are deformed simultaneously in a single operation;

Fig. 7 is a view in perspective of a modified form of the pre-shaped cable splicing compression sleeve;

Figure 8:
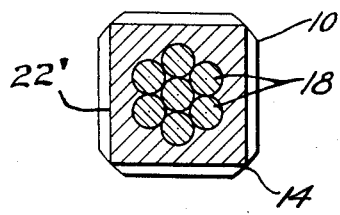
Fig. 8 is an enlarged sectional view similar to Fig. 5, illustrating how the cross-sectional area of the pre-shaped sleeve may be reduced at spaced points therealong by a modified matching die set in which the opposed pairs of die faces present plane working surfaces to the side walls of the sleeve transversely thereof.

Referring to the drawings and in accordance with the inventive concept underlying the invention, a pre-shaped cable splicing compression sleeve 10, of a grade of aluminum or copper having the required metallurgical characteristics, is either extruded, forged, cold rolled, die drawn or die stamped, depending on whether the cross-sectional configuration of the sleeve, throughout its length or in any part thereof, is to be polygonal, square, triangular, rectangular, hexagonal, octagonal or any of these plane surface configurations in combination with an annular or circular configuration in cross-section.

In one practical embodiment of the invention, as exemplified in Figs. 1 and 2, and now to be described, the pre-shaped sleeve 10 is provided with an opening 12 substantially centrally therethrough and so shaped during its production in one of the above-noted manners that its sleeve defining annular wall presents, for example, segmental or rounded corner-defining areas 14, having a normal wall thickness in cross section, and intervening plane surface areas 16, having a reduced wall thickness in cross-section, the aforesaid areas 14 and 16 extending lengthwise of the sleeve 10 in angularly spaced relation throughout the length thereof.

Accordingly, the plane surface areas 16, formed on the sleeve 10 in accordance with the invention, provide wall portions of reduced or minimum thickness in cross-section, as indicated by the vertical and horizontal transverse axes A—A and B—B, respectively, in Fig. 2, relative to the thickness of such annular wall portions which retain a predetermined circular or circumferential configuration and/or dimension in cross-section.

Further, in accordance with the invention and with particular reference to Figs. 3, 4 and 5, the opening 12 through the pre-shaped sleeve 10 is of such size and/or configuration as to freely receive within its opposite ends, the bare end portion 18 of each of a pair of multiple-strand cable sections 20 in opposed end-to-end relation and equidistantly within the sleeve 10.

As thus assembled, and further in accordance with the invention, spaced portions of the pre-shaped sleeve 10, along each of the plane surface areas 16, are simultaneously subjected to a gradual compression and/or indenting operation whereby to secure the pre-shaped compression sleeve 10 on the bare end portions 18 of the respective cable sections 20.

As best shown in Figs. 4 and 5, the compression sleeve 10 is secured on the bare end portions of the cable sections 20 in intimate "cold metal flow" relation by means of a plurality of spaced indentations or depressions 22, formed in each of the plane surface areas 16, whereby the metal in the regions of reduced thickness is deformed and/or compressed on and about the intruded bare cable end portions 18. If the sleeve 10, per se, were to be indented in its regions of reduced wall thickness as aforesaid, each indentation would deform the inner wall of the sleeve 10, defining the opening 12 therethrough, substantially in the manner illustrated in Fig. 6. However, since the bare cable end portions 18, when intruded in the sleeve 10, resist inward deformation as in Fig. 6, the metal is deformed and/or compressed on and about the multiple cable strands as exemplified in Fig. 5.

Referring now to Fig. 7, and in accordance with the invention, the pre-shaped sleeve 10 may be so formed as to present an annular intermediate portion 24, and annular opposite end portions 26 with portions of the sleeve 10 therebetween each defining a plurality of angularly related or angularly spaced plane surface areas 28 of reduced wall thickness relative to the wall thickness of the annular portions 24 and 26, and adapted to be deformed and/or indented in the manner illustrated in Figs. 4 and 5. Similarly, the pre-shaped compression sleeve 10 illustrated in Fig. 1 may be so modified as to include opposite end portions which are of circular or annular configuration in cross-section having a normal wall thickness and constituting non-deformable sleeve areas.

Figure 9:
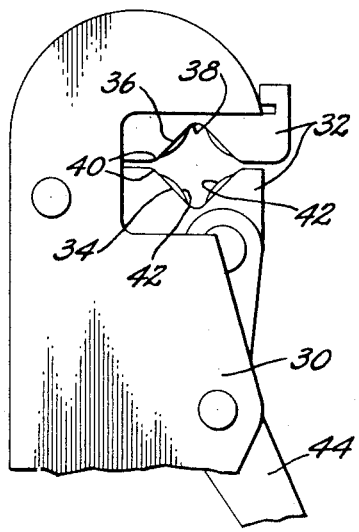
Fig. 9 is a view in side elevation of a known form of compression tool of the short-stroke pliers type which is adapted to be manipulated by one hand of an operator and with a complementary matching die set mounted therein for relative movement and adapted to deform or indent the reduced wall areas of the pre-shaped compression sleeve as shown in Figs. 4, 5 and 6.
Figure 10:
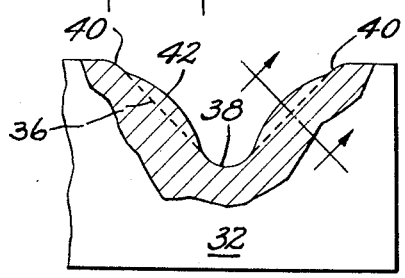
Fig. 10 is a fragmentary view in elevation, partly in section, of one of the elements of the matching die set shown in Fig. 8 to further illustrate on an enlarged scale the configuration of a pair of working die faces formed therein, in accordance with the invention.
Figure 11:
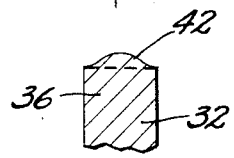
Fig. 11 is a fragmentary sectional view taken on the line 10—10 of Fig. 9.

Further in accordance with the invention and with reference to Figs. 9, 10 and 11, the indentations or depressions 22 provided in the plane surface areas 16 of the pre-shaped compression sleeve 10 are formed by means of a compression tool 30, of the short stroke pliers type, as in Bergan Patent No. 2,696,747, when provided with a novel matching die set 32 comprising a pair of complementary jaw members defining in outline, when in closed position, an angular opening corresponding in configuration substantially to the cross-sectional configuration of the pre-shaped compression sleeve 10, adapted to be received therein.

As best shown in Figs. 9, 10 and 11, the complementary jaw members, comprising the matching die set 32 mounted in the compression tool 30, each comprise flat, substantially rectangular sections of suitable steel having a predetermined thickness and mounted to have relative movement, each jaw member being formed with an angular cut-out in one edge face thereof whereby to provide pairs of oppositely disposed, angularly related, complementary die faces 34, each presenting straight marginal edges 36, a rounded clearance recess 38 between each pair of the die faces 34 and rounded end portions 40, respectively. Preferably, although not necessarily, each die face 34 of each pair includes an inclined irregular surface rising from its marginal edges 36, and rounded portions 38 and 40, to define a blunt protuberance 42 of appropriate height and surface contour centrally thereof, as best shown in Figs. 9 and 10, whereby both pairs of the die faces 34 are adapted to exercise initial point contact substantially in the center of all of the plane surface areas 16 pre-formed on the compression sleeve 10. Thus, as the pressure initially applied on the pivoted hand member 44 of the compression tool 30 is gradually increased, the plane surface areas 16 of minimum wall thickness angularly related or angularly spaced about the pre-shaped sleeve 10 are deformed and such wall deformation increased progressively by the contour of the complementary pairs of die faces 34 until a substantially rectangular indentation 22 of non-uniform depth is produced in each of the plane surface areas 16, simultaneously in response to each compression, deformation and/or indenting operation, whereby the opposite end edges of each substantially rectangular indentation 22 feather out in the segmental areas 14 constituting annular wall portions of the sleeve 10.

In a single deforming and/or indenting operation, the compression tool 30 is placed about a pre-shaped sleeve 10 and pressure applied on the handle 44 thereof, whereby initial point contact, compressive force is applied substantially centrally of each of the plane surface areas 16 of minimum wall thickness simultaneously to produce indents of maximum depth, and subsequently spreading oppositely disposed end portions of the indents so formed transversely of said plane surface areas 16 while decreasing the depth thereof in response to continued application of compressive force to produce substantially rectangular indentations 22 of non-uniform depth extending transversely of the sleeve 10 to and between the intervening areas 14 thereof.

It is here to be noted that by reason of the areas of reduced or minimum wall thickness defined by the plane surface areas 16 about the novel pre-shaped compression sleeve 10, in whole or in part, a compression tool of the character hereinbefore identified is utilizable in carrying out the method of securing the pre-shaped sleeve 10 on a pair of oppositely disposed, bare cable end portions 18 in intimate "cold metal flow" bonded relation therewith, because the areas of minimum wall thickness about the sleeve 10, as provided by the plane surface areas 16, present a minimum mass of metal to the matching die for deformation, indentation and/or compression, all in accordance with the invention.

While each die face 34 of the matching die set 32 has been illustrated and described as including a blunt protuberance 42 centrally thereof, by way of example, it is to be expressly understood that the protuberance 42 on each die face 34 may be omitted in order to provide equivalent die faces adapted to present plane, rectangular working surfaces substantially across the plane surface areas 16 of the pre-shaped sleeve 10, whereby the cross-sectional area thereof may be reduced by compression at spaced points therealong in a manner as hereinbefore described and as indicated at 22' in Fig. 8. Therefore, the invention is not to be limited except as is necessitated by the prior art and the scope of the appended claim.

I claim:

The method of deforming a pre-shaped, cable splicing, compression sleeve of malleable metal presenting angularly spaced plane surface areas of reduced wall thickness having a transverse dimension less than the outer diameter of the intervening areas of said sleeve and extending lengthwise throughout the length thereof, which consists of forming the compression sleeve of solid, continuous, unbroken cross section throughout except for a longitudinal bore formed therein to receive the bare ends of a cable, inserting the bare end portion of each of a pair of multiple-strand cable sections into the opposite ends of the sleeve, initially applying a point contact compressive force centrally of each of said areas of reduced wall thickness simultaneously to produce indents of maximum depth, and subsequently spreading oppositely disposed end portion of the indents so formed transversely of said sleeve while progressively decreasing the depth thereof during continued application of compressive force to produce substantially rectangular indents of non-uniform depth extending to and between the intervening areas of said sleeve.

References Cited in the file of this patent

UNITED STATES PATENTS

| | | |
|---|---|---|
| 618,817 | Vanstone | Jan. 31, 1899 |
| 650,860 | McTighe | June 5, 1900 |
| 2,008,227 | Reilly | July 16, 1935 |
| 2,030,803 | Temple | Feb. 11, 1936 |
| 2,138,617 | Scott | Nov. 29, 1938 |
| 2,279,677 | Heinrich | Apr. 14, 1942 |
| 2,314,884 | Klein | Mar. 30, 1943 |
| 2,411,838 | Swengel | Nov. 26, 1946 |
| 2,435,562 | Swengel | Feb. 3, 1948 |
| 2,576,528 | Matthysse | Nov. 27, 1951 |
| 2,759,256 | Bergan | Aug. 21, 1956 |